US011706323B2

(12) United States Patent
Kanamarlapudi et al.

(10) Patent No.: US 11,706,323 B2
(45) Date of Patent: Jul. 18, 2023

(54) MANAGING A REORDERING TIMER

(71) Applicant: QUALCOMM Incorporated, San Diego, CA (US)

(72) Inventors: Sitaramanjaneyulu Kanamarlapudi, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 17/166,244

(22) Filed: Feb. 3, 2021

(65) Prior Publication Data
US 2021/0258409 A1 Aug. 19, 2021

Related U.S. Application Data

(60) Provisional application No. 62/975,832, filed on Feb. 13, 2020.

(51) Int. Cl.
*H04L 69/28* (2022.01)
*H04W 76/28* (2018.01)
(Continued)

(52) U.S. Cl.
CPC .............. *H04L 69/28* (2013.01); *H04L 1/08* (2013.01); *H04L 49/90* (2013.01); *H04W 72/23* (2023.01); *H04W 76/28* (2018.02)

(58) Field of Classification Search
CPC . H04L 69/28; H04L 1/08; H04L 49/90; H04L 47/2475; H04L 47/28; H04L 47/34;
(Continued)

(56) References Cited

U.S. PATENT DOCUMENTS

2007/0223539 A1* 9/2007 Scherpbier .......... H04L 65/1101
370/532
2011/0149919 A1* 6/2011 Kapoor ................ H04L 1/1841
370/336
(Continued)

FOREIGN PATENT DOCUMENTS

WO 2010129533 A2 11/2010
WO 2015157506 A1 10/2015
(Continued)

OTHER PUBLICATIONS

International Search Report and Written Opinion—PCT/US2021/016507—ISA/EPO—dated Apr. 30, 2021 15 pages.

*Primary Examiner* — Kiet Tang
(74) *Attorney, Agent, or Firm* — Qualcomm Incorporated

(57) ABSTRACT

Embodiments include methods for managing a reordering timer performed by a processor of a wireless device. The processor may receive packets from a communication network and store the packets in a memory buffer of the wireless device. The processor may detect one or more conditions that affect an amount of time required to reorder or reassemble at least some of the packets received from the communication network. The processor may determine a timer adjustment based on the detected one or more conditions. The processor may adjust a timer with the determined timer adjustment. The processor may deliver one or more packets from the memory buffer in response to expiration of the adjusted timer.

30 Claims, 15 Drawing Sheets

(51) Int. Cl.
*H04L 49/90* (2022.01)
*H04L 1/08* (2006.01)
*H04W 72/23* (2023.01)

(58) Field of Classification Search
CPC ... H04L 1/1848; H04L 1/1896; H04L 1/1841; H04W 72/042; H04W 76/28; H04W 80/02; H04W 88/02; H04W 28/0231
See application file for complete search history.

(56) References Cited

U.S. PATENT DOCUMENTS

| | | | |
|---|---|---|---|
| 2013/0107727 A1* | 5/2013 | Lunden | H04W 52/0216 370/252 |
| 2016/0065700 A1* | 3/2016 | Yi | H04L 69/04 370/328 |
| 2017/0041976 A1* | 2/2017 | Van | H04W 76/18 |
| 2017/0295516 A1 | 10/2017 | Gao et al. | |
| 2019/0173562 A1* | 6/2019 | Yu | H04B 7/0695 |

FOREIGN PATENT DOCUMENTS

| WO | 2017156763 A1 | 9/2017 |
|---|---|---|
| WO | 2017201715 A1 | 11/2017 |
| WO | 2019006945 A1 | 1/2019 |

\* cited by examiner

MANAGING A REORDERING TIMER

RELATED APPLICATIONS

This application claims the benefit of priority to U.S. Provisional Application No. 62/975,832 entitled "Managing A Reordering Timer" filed Feb. 13, 2020, the entire contents of which are hereby incorporated by reference for all purposes.

BACKGROUND

Packet data units ("packets") traveling across a communication network may arrive at a destination device out of the order in which the packets were sent. Wireless devices and base stations may be configured with a capability to reorder received packets. The Packet Data Convergence Protocol (PDCP) is located in a radio protocol stack and may provide various services to higher-level layers in the protocol stack, including packet reordering. Packets received from one or more sources (such as different Radio Link Control/Medium Access Control (RLC/MAC)) entities may be held in a reordering buffer at the PDCP level to wait for the arrival of one or more missing packets for a period of time indicated by a reordering timer.

The value of the reordering timer is typically set by a network device (such as by a base station). A large reordering timer value decreases packet loss, but increases memory requirements imposed on a wireless device for storing packets as well as packet delivery latency. A small reordering timer value decreases latency and the amount of memory required by the wireless device for holding packets, but increases packet loss. Further, the base station (or other network device) may have limited information about conditions detected by the wireless device such as air interface link quality, communication link congestion, and actual packet reception error rates.

SUMMARY

Various aspects include methods for managing a timer for reordering and/or reassembling packets that may be performed by a processor of a wireless device. Various aspects may include receiving packets from a communication network and storing the packets in a memory buffer of the wireless device, detecting one or more conditions that affect an amount of time required to reorder or reassemble at least some of the packets received from the communication network, determining a timer adjustment based on the detected one or more conditions, adjusting a timer with the determined timer adjustment, and delivering one or more packets from the memory buffer in response to expiration of the adjusted timer.

In some aspects, the conditions that affect an amount of time required to reorder and reassemble packets received from the communication network may include one or more operational conditions of the wireless device. In some aspects, the conditions that affect an amount of time required to reorder and reassemble packets received from the communication network may include one or more conditions of a wireless communication link between the wireless device and the communication network. In some aspects, the conditions that affect an amount of time required to reorder and reassemble packets received from the communication network may include one or more of a characteristic of packet retransmissions requested by the wireless device; a characteristic of a tune-away of a radio frequency resource of the wireless device from a first subscription to a second subscription; a characteristic of beam refinement operations performed by the wireless device; a characteristic of discontinuous reception (DRX) configurations of the wireless device; a characteristic of a delay tolerance of an application that uses the packets; a characteristic of the packets received from the communication network; and a characteristic of a loss of packet scheduling information.

In some aspects, determining a timer adjustment based on the detected one or more conditions may include determining the timer adjustment based on historical condition information. In some aspects, the timer may be a network-determined timer, and the method may include receiving the network determined timer via a control signal from the network.

Some aspects may further include determining one or more condition adjustments wherein each condition adjustment is based on a detected condition, wherein determining the timer adjustment based on the detected one or more conditions may include determining the timer adjustment based on the determined one or more trigger condition adjustments. Some aspects may further include receiving additional packets and reordering the packets and the additional packets before the adjusted timer expires.

In some aspects, detecting one or more conditions that affect an amount of time required to reorder at least some of the packets received from the communication network may include detecting one or more characteristics of requested packet retransmissions, and determining a timer adjustment based on the detected one or more conditions may include determining the timer adjustment based on the detected characteristics of the requested packet retransmissions.

In some aspects, detecting one or more conditions that affect an amount of time required to reorder at least some of the packets received from the communication network may include detecting one or more characteristics of a tune-away of a radio frequency resource of the wireless device from a first subscription to a second subscription, and determining a timer adjustment based on the detected one or more conditions may include determining the timer adjustment based on the detected characteristics of the tune-away of the radio frequency resource.

In some aspects, detecting one or more conditions that affect an amount of time required to reorder at least some of the packets received from the communication network may include detecting one or more characteristics of beam refinement operations performed by the wireless device, and determining a timer adjustment based on the detected one or more conditions may include determining the timer adjustment based on the detected characteristics of the beam refinement operations performed by the wireless device.

In some aspects, detecting one or more conditions that affect an amount of time required to reorder at least some of the packets received from the communication network may include detecting one or more characteristics of discontinuous reception configurations of the wireless device, and determining a timer adjustment based on the detected one or more conditions may include determining the timer adjustment based on the detected characteristics of discontinuous reception configurations of the wireless device.

In some aspects, detecting one or more conditions that affect an amount of time required to reorder at least some of the packets received from the communication network may include detecting one or more characteristics of a loss of packet scheduling information, and determining a timer adjustment based on the detected one or more conditions may include determining the timer adjustment based on the detected characteristics of the loss of packet scheduling information.

In some aspects, detecting one or more conditions that affect an amount of time required to reorder at least some of the packets received from the communication network may include detecting one or more characteristics of a delay tolerance of an application that uses the packets, and determining a timer adjustment based on the detected one or more conditions may include determining the timer adjustment based on the detected characteristics of the delay tolerance of the application that uses the packets.

In some aspects, detecting one or more conditions that affect an amount of time required to reorder at least some of the packets received from the communication network may include detecting one or more priority characteristics of the packets received from the communication network, and determining a timer adjustment based on the detected one or more conditions may include determining the timer adjustment based on the detected priority characteristics of the packets received from the communication network.

In some aspects, determining a timer adjustment based on the detected one or more conditions may include determining a timer adjustment based on historical condition information and the detected one or more conditions.

Further aspects may include a wireless device having a processor configured to perform one or more operations of any of the methods described above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of any of the methods described above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
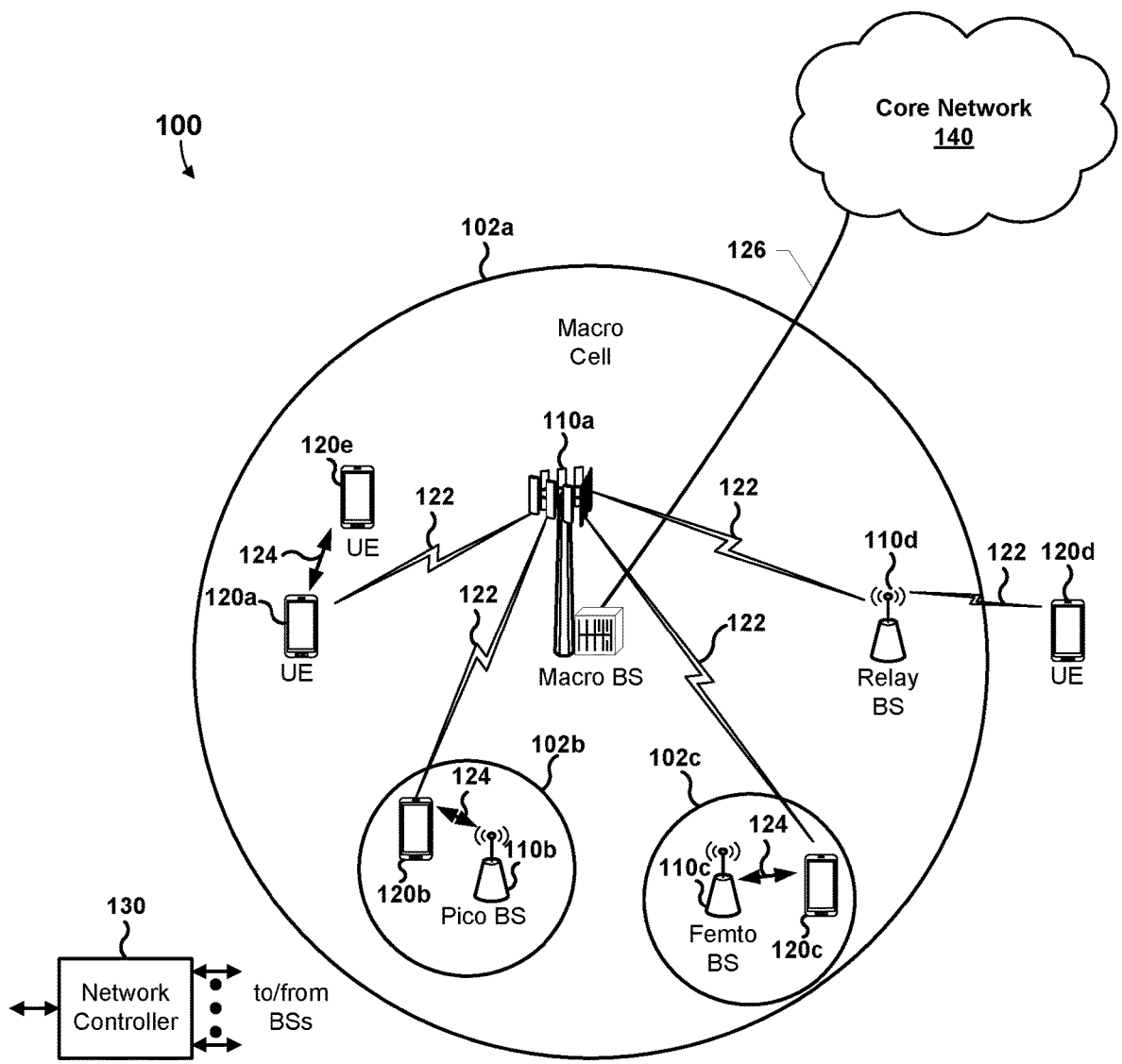
FIG. 1 is a system block diagram conceptually illustrating an example communications system including a small cell and a problem that can develop in such systems.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and wireless devices implementing the methods to dynamically determine an adjustment to a packet reordering timer in view of conditions and factors determined by the wireless device. Thus, instead of using a reordering timer duration dictated by a network element such as a base station, the wireless device processor may take into account wireless device-specific conditions to adjust the wireless device's packet reordering timer to provide a wireless device-specific balancing of memory usage, processing resources, and packet delivery latency.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

The terms "timer" and "reordering timer" are used herein to refer to a timer for tracking a duration for holding a number of packets or an amount of packet data, which may include partial or fragmentary packet data, for reordering of the packets and/or reassembly of the partial or fragmentary packet data.

Data packets transmitted by a wireless communication network may arrive at a destination wireless device out of the order in which the packets are intended to be processed for a variety of reasons. The deployment of 5G New Radio (NR) capabilities introduces network complexity that may contribute to out of order packet delivery. For example, Evolved Universal Terrestrial Radio Access (E-UTRA) New Radio-Dual Connectivity (EN-DC) may support certain NR data rates and capabilities supported by a legacy 4G Long Term Evolution (LTE) core network. In such a system, a wireless device may receive data packets from two or more different sources, such as different RLC/MAC entities, and as a result the packets may be received in an order different from their processing or presentation order.

The wireless device processor may combine received packets at the PDCP level, and then deliver the packets to higher layers in the radio protocol stack, such as the radio resource control (RRC) and user plane layers. The wireless device processor may hold packets that are received out of order in memory in a reordering buffer for a duration of time indicated by a reordering timer. Additionally or alternatively, the wireless device processor may hold partial or fragmentary packet data in memory to enable the packet to be reassembled when the remaining packet data is received. The number (or amount) of packets (or packet data) held or the size of the reordering buffer may be dictated by a window of time (e.g., a reordering timer) or number of packets (a reordering buffer window), such as a PDCP window. The duration or value of the reordering timer is typically set by a network device (such as by a base station). Upon expiration of the reordering timer, the wireless device processor may move the reordering buffer window and deliver packets temporarily stored in the reordering buffer to the higher layers of the radio protocol stack for processing in the intended order.

When a large number of packets are held in the reordering buffer, the reordering buffer may fill rapidly and may run out of memory. Thus, a large reordering timer value decreases packet loss, but increases memory requirements imposed on a wireless device for storing packets as well as packet delivery latency. A small reordering timer value decreases packet delivery latency and the amount of memory required by the wireless device for holding packets, but increases packet loss. The base station may have limited information about conditions detected by the wireless device such as air interface link quality, communication link congestion, and actual packet reception error rates. In most cases, the wireless device has more information regarding the downlink air interface link quality, downlink communication link congestion, and experienced packet reception error rates, as well as other operating conditions. Thus, the wireless device may be better able to dynamically determine an appropriate reordering timer value than the base station or another network element.

Various embodiments include methods that may be performed by a processor of a wireless device, instead of a network element, for managing a reordering timer used by the processor in the process of receiving and reordering data packets before delivery to higher layers in the radio protocol stack. In various embodiments, the wireless device may receive packets from a communication network and a processor of the wireless device may store the packets in a memory buffer (i.e., the reordering buffer) of the wireless device. The wireless device processor may detect one or more conditions that affect an amount of time required to reorder at least some of the packets received from the communication network. Based on the detected one or more conditions, the wireless device processor may determine an appropriate timer adjustment. In some embodiments, the wireless device processor may determine one or more condition adjustments. In such embodiments, each condition adjustment may be based on a detected condition. In some embodiments, the processor may determine the timer adjustment based on the determined one or more condition adjustments. In some embodiments, the processor may increase or decrease a length or duration of the timer adjustment based on each condition adjustment, and the processor may combine all determined condition adjustments to determine the final timer adjustment.

The one or more conditions may include a variety of operational conditions of the wireless device or conditions of the wireless communication link between the wireless device and a base station that are determined by the wireless device. Typically, the wireless device processor may determine conditions more specifically or more accurately with respect to the wireless device than another network element, such as a base station with which the wireless device communicates.

In some embodiments, the wireless device processor may detect one or more characteristics of packet retransmissions requested by the wireless device. For example, the wireless device processor may detect that the wireless device has requested one or more packet retransmissions, such as through an automatic repeat request (ARQ) or hybrid ARQ (HARQ) procedure. In some embodiments, the wireless device processor may determine, for example, a number of retransmissions requested, a number of retransmitted packets received, an amount of block error rate (BLER), the length of a transmission time interval (TTI) of a carrier performing retransmission, and a type of duplexing used by the retransmitting carrier (e.g., frequency division duplexing (FDD) or time division duplexing (TDD). In some embodiments, the wireless device processor may determine the timer adjustment based on the detected characteristics of the requested packet retransmissions.

In some embodiments, the wireless device processor may detect one or more characteristics of a tune-away of a radio frequency resource of the wireless device from a first subscription to a second subscription. In some embodiments, the wireless device processor may periodically tune a radio frequency (RF) resource away from a first subscription to a second subscription to perform one or more operations, following which the wireless device processor may tune the RF resource back to the first subscription. In some embodiments, the wireless device processor may determine a type of operation to be performed during the tune away. In some embodiments, different types of operations may require a different length of tune away. For example, the wireless device processor may perform the tune-away to perform page decoding, to perform measurements on the second subscription, or to perform Non-Access Stratum (NAS) procedures (such as IDLE mode procedures, or to report a tracking area update) on the second subscription, each of which may require a different amount or duration of time, or which may be scheduled by the wireless device or by a base station to be performed during a different amount or duration of time. In some embodiments, the wireless device processor may determine a radio access technology (RAT) of the second subscription. In some embodiments, the protocols and processes of different RATs (e.g., GSM, LTE, NR) may affect a length of the tune away. In some embodiments, the wireless device processor may determine the timer adjustment based on the detected characteristics of the tune-away of the radio frequency resource.

In some embodiments, the wireless device processor may detect one or more characteristics of beam refinement operations performed by the wireless device. In some embodiments, the wireless device processor may determine whether the wireless device is performing beam refinements or beam switching (collectively referred to herein as "beam refinements" or "beam refinement operations"). In some embodiments, the wireless device processor may determine a number of beam refinements performed by the wireless device. In some embodiments, performing beam refinements may result in downlink scheduling delays. Based on the detection of, or the severity of, beam refinement operations, the wireless device processor may determine the timer adjustment based on the detected characteristics of the beam refinement operations performed by the wireless device.

In some embodiments, the wireless device processor may detect one or more characteristics of discontinuous reception (DRX) configurations of the wireless device. In some embodiments, the wireless device processor may determine a DRX cycle length. In some embodiments, the wireless device processor may determine a RAT of the communication link on which DRX is being performed, as different RAT procedures or protocols may affect the DRX cycle length. In some embodiments, the wireless device processor may determine the timer adjustment based on the detected characteristics of discontinuous reception configurations of the wireless device.

In some embodiments, the wireless device processor may detect one or more characteristics of a loss of packet scheduling information. In some embodiments, the wireless device processor may briefly lose or not receive scheduling information from a base station, such as because of bad channel quality, or because of momentary variation in channel quality information (CQI). In some embodiments, the wireless device processor may require additional time to recover missed or lost scheduling information. In some embodiments, the wireless device processor may determine the timer adjustment based on the detected characteristics of the loss of packet scheduling information.

In some embodiments, the wireless device processor may detect one or more characteristics of a delay tolerance of an application that uses the packets. For example, an application executing on the wireless device (such as a user application) may be more, or less, tolerant of packet delay or packet latency than the network-configured timer. For example, some applications, such as voice over Internet Protocol (VoIP), media streaming applications, and games, are highly delay sensitive (that is, are not delay tolerant), and packet latency may cause the performance of such applications to degrade. As another example, applications such as a web browser and social media applications may be relatively delay tolerant, such that their performance may not be substantially affected by packet delay or latency. In some embodiments, the wireless device processor may determine an amount of packet delay, packet latency, BLER, or another suitable measurement of packet delay that the application may tolerate. In some embodiments, the wireless device processor may determine the timer adjustment based on the detected characteristics of the delay tolerance of the application that uses the packets.

In some embodiments, the wireless device processor may detect one or more priority characteristics of the packets received from the communication network. For example, the wireless device processor may detect that one or more packets received from the communication network are high priority or high importance packets. In some embodiments, the wireless device processor may detect the packet priority characteristics in a packet header, in control signaling received from the base station, in other information associated with the packets (such as metadata), or in other information received from the communication network. In some embodiments, based on the receipt of high-priority or high importance packets, the wireless device processor may increase the timer adjustment. In some embodiments, the wireless device processor may determine the timer adjustment based on the detected priority characteristics of the packets received from the communication network.

In some embodiments, the wireless device processor may determine the timer adjustment based on historical condition information and the detected one or more conditions. In some embodiments, the wireless device processor may store in memory historical condition information as well as one or more detected conditions. In some embodiments, the wireless device processor may store in memory one or more previously-determined or historical timer adjustments. In some embodiments, the wireless device processor may determine the current timer adjustment based at least in part on historical condition information or historical timer adjustments. In some embodiments, the wireless device processor may determine the current timer adjustment based on a weighted average of a number of historical timer adjustments.

In some embodiments, the wireless device processor may adjust a timer (for example, a PDCP reordering timer) with the determined timer adjustment. In some embodiments, the wireless device processor may receive the timer from the network (e.g., via Radio Resource Control (RRC) signaling) and may adjust the received timer using the determined timer adjustment. In some embodiments, before the adjusted timer expires, the wireless device processor may receive additional packets and reorder the packets and the additional packets. In some embodiments, after the adjusted timer expires, the wireless device processor may deliver one or more packets from the memory buffer, for example, to a higher layer of the radio protocol stack.

FIG. 1 illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of wireless devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. A wireless device 120a-e may be included inside a housing that houses components of the wireless device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
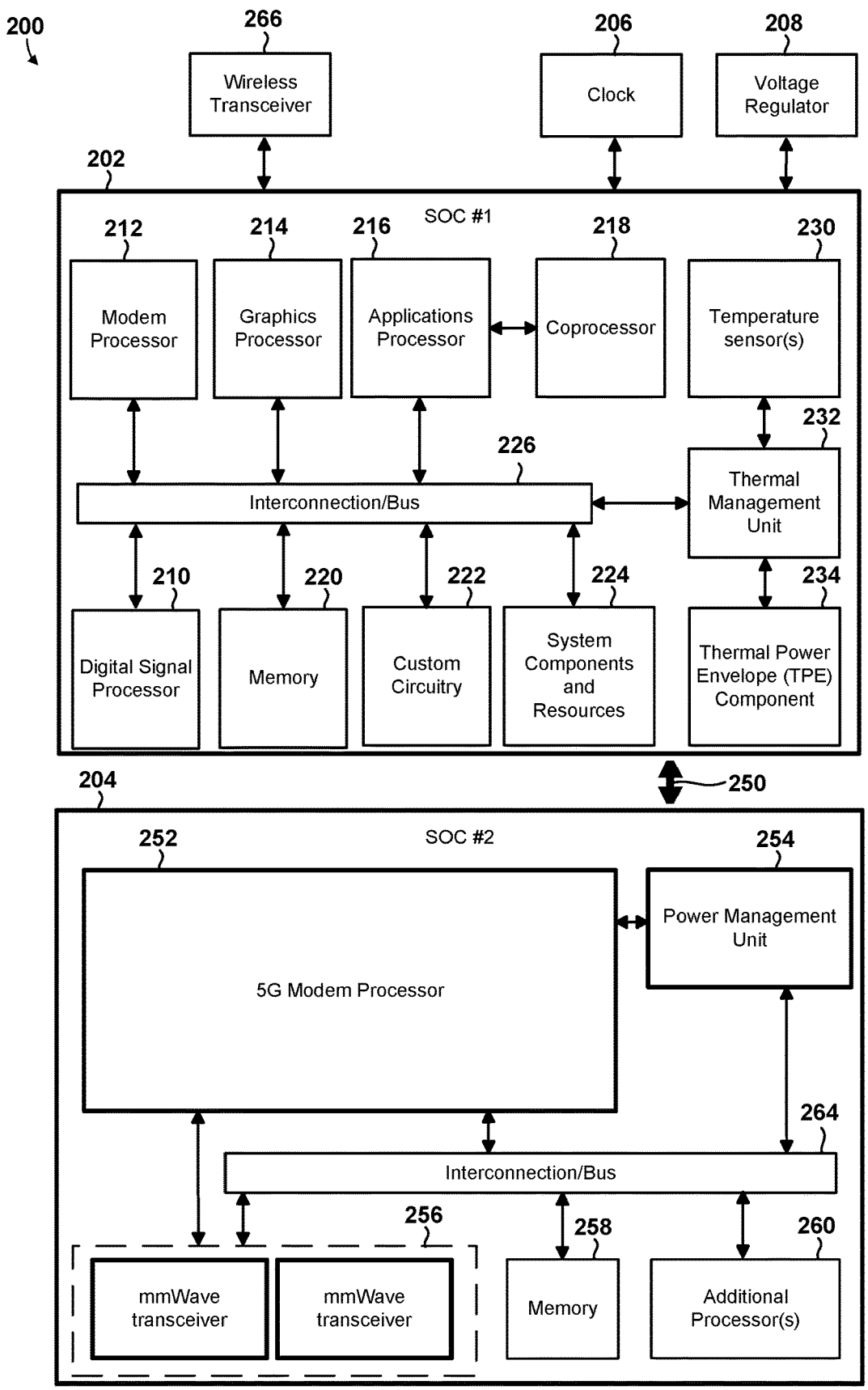
FIG. 2 is a component block diagram illustrating a computing system that may be configured to implement management of cell selection in accordance with various embodiments.

In some implementations, two or more wireless devices 120a-e (for example, illustrated as the wireless device 120a and the wireless device 120e) may communicate directly using one or more sidelink channels 124 (for example, without using a base station 110 as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a Various embodiments may be implemented on a number of single processor and multiprocessor computer systems, including a system-on-chip (SOC) or system in a package (SIP). FIG. 2 illustrates an example computing system or SIP 200 architecture that may be used in wireless devices implementing the various embodiments.

With reference to FIGS. 1 and 2, the illustrated example SIP 200 includes a two SOCs 202, 204 coupled to a clock 206, a voltage regulator 208, and a wireless transceiver 266 configured to send and receive wireless communications via an antenna (not shown) to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
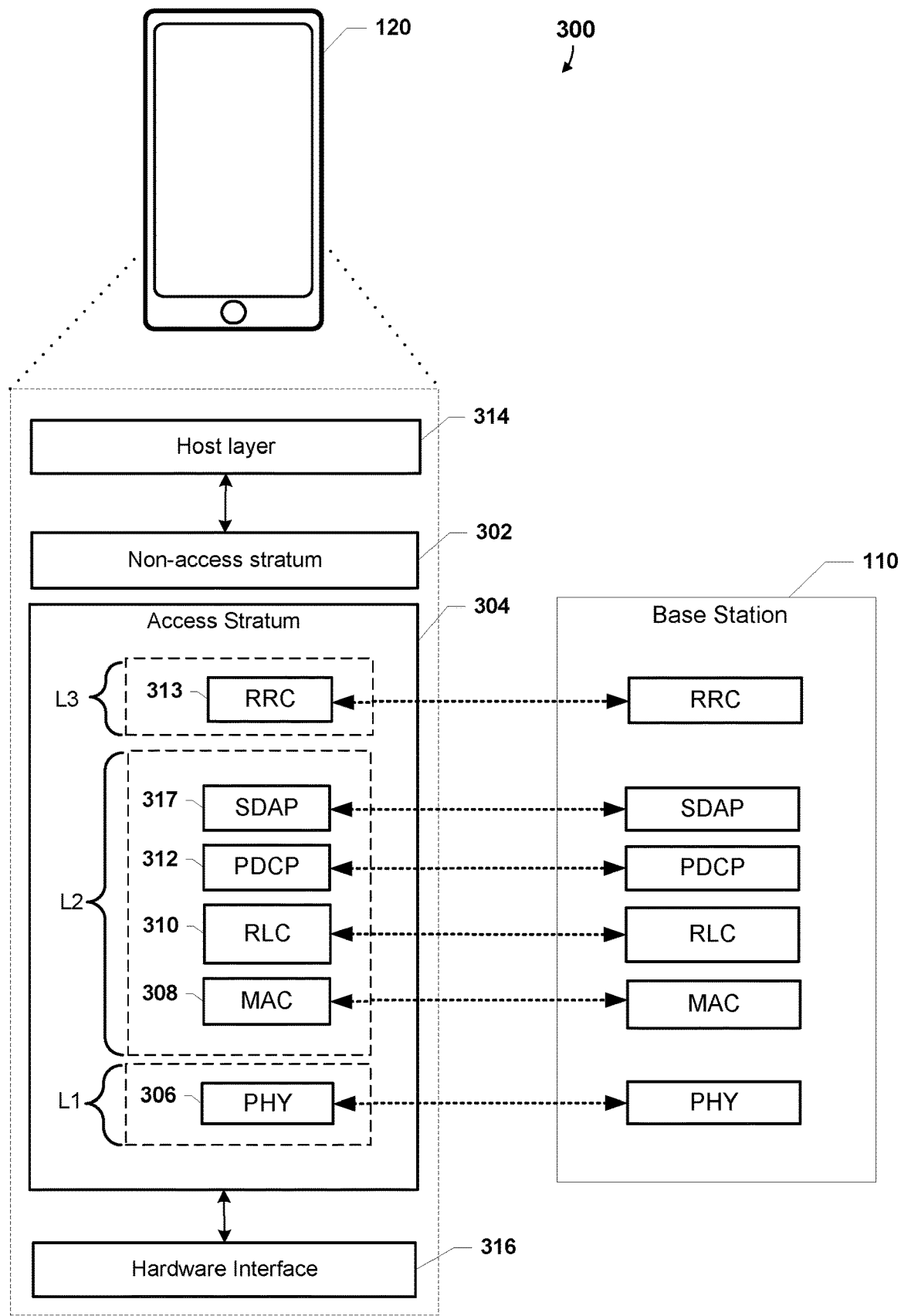
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and control planes in wireless communications between a base station 110 (e.g., the base station 110a) and a wireless device 120 (e.g., the wireless device 120a-120e, 200). With reference to FIGS. 1-3, the wireless device 120 may implement the software architecture 300 to communicate with the base station 110 of a communication system (e.g., 100). In various embodiments, layers in software architecture 300 may form logical connections with corresponding layers in software of the base station 110. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 120 and the base station 110 over the physical layer 306. In the various embodiments, Layer 2 may include a media access control (MAC) sublayer 308, a radio link control (RLC) sublayer 310, a packet data convergence protocol (PDCP) 312 sublayer, and a Service Data Adaptation Protocol (SDAP) 317 sublayer, each of which form logical connections terminating at the base station 110.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 120 and the base station 110.

In some embodiments, the SDAP sublayer 317 may provide mapping between Quality of Service (QoS) flows and data radio bearers (DRBs). In the downlink, at the base station 110, the SDAP sublayer 317 may provide mapping for DL QoS flows to DRBs. In the uplink, at the wireless device 120, the SDAP sublayer 317 may deliver DL received QoS flows to upper layers. In some embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 120. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
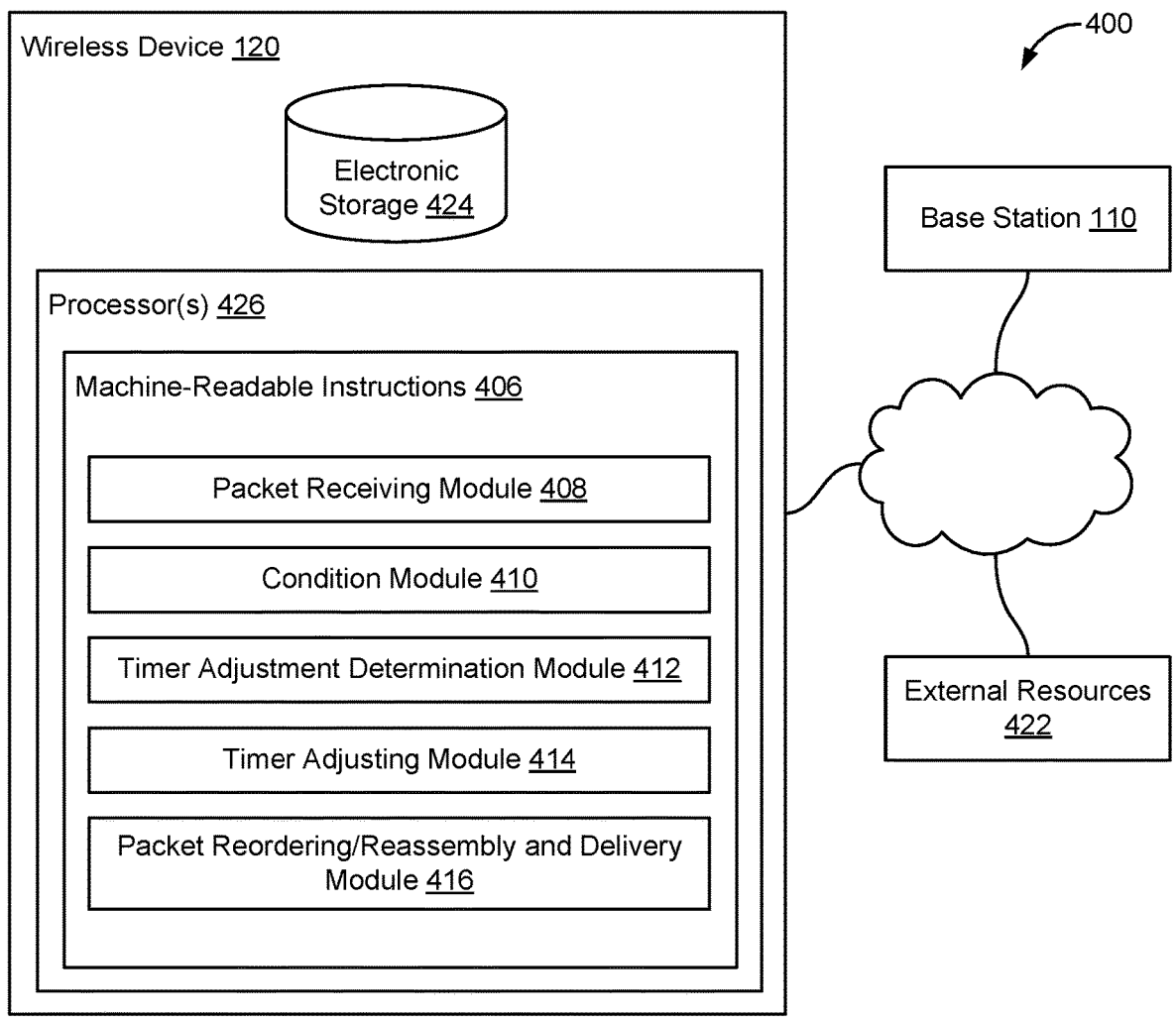
FIG. 4 is a component block diagram illustrating a system configured for managing a reordering timer performed by a processor of a wireless device in accordance with various embodiments.

FIG. 4 is a component block diagram illustrating a system 400 configured for managing a reordering timer performed by a processor of a wireless device in accordance with various embodiments. With reference to FIGS. 1-4, the system 400 may include one or more wireless devices 120 (e.g., the wireless device 120a-120e, 200) and/or one or more base stations 110 (e.g., the base stations 110a-110d, 110). External resources 422 may include sources of information outside of system 400, external entities participating with system 400, and/or other resources. In some implementations, some or all of the functionality attributed herein to external resources 422 may be provided by resources included in system 400.

Wireless device 120 may be configured by machine-readable instructions 406. Machine-readable instructions 406 may include one or more instruction modules. The instruction modules may include computer program modules. The instruction modules may include one or more of a packet receiving module 408, a condition module 410, a timer adjustment determination module 412, a timer adjusting module 414, a packet reordering/reassembly and delivery module 416, and/or other instruction modules.

The packet receiving module 408 may be configured to receive packets from a communication network and store the packets in a memory buffer of the wireless device. The packet receiving module 408 may be configured to receive additional packets and store the additional packets in the memory buffer of the wireless device.

The condition module 410 may be configured to detect one or more conditions that affect an amount of time required to reorder or reassemble at least some of the packets received from the communication network. In various embodiments, the condition module 410 may be configured to detect one or more characteristics of requested packet retransmissions, one or more characteristics of a tune-away of a radio frequency resource of the wireless device from a first subscription to a second subscription, one or more characteristics of beam refinement operations performed by the wireless device, one or more characteristics of discontinuous reception configurations of the wireless device, one or more characteristics of a loss of packet scheduling information, and/or one or more characteristics of a delay tolerance of an application that uses the packets.

The timer adjustment determination module 412 may be configured to determine a timer adjustment based on the detected one or more conditions. The timer adjustment determination module 412 may be configured to determine one or more condition adjustments wherein each condition adjustment is based on a detected condition. In some embodiments, the timer adjustment determination module 412 may be configured to determine the timer adjustment based on the determined one or more condition adjustments. In some embodiments, the timer adjustment determination module 412 may be configured to determine the timer adjustment based on historical condition information and the detected one or more conditions. In various embodiments, the timer adjustment determination module 412 may be configured to determine the timer adjustment based on the detected characteristics of the requested packet retransmissions, the detected characteristics of the tune-away of the radio frequency resource, the detected characteristics of the beam refinement operations performed by the wireless device, the detected characteristics of discontinuous reception configurations of the wireless device, and/or the detected characteristics of the detected characteristics of the delay tolerance of the application that uses the packets.

The timer adjusting module 414 may be configured to adjust a timer with the determined timer adjustment.

The packet reordering/reassembly and delivery module 416 may be configured to reorder and/or reassemble the packets and the additional packets before the adjusted timer expires. The packet reordering and delivery module 416 may be configured to deliver one or more packets from the memory buffer in response to the expiration of the adjusted timer.

In some implementations, wireless device 120, base station 110, and/or external resources 422 may be operatively linked via one or more electronic communication links (e.g., wireless communication link 122, 124, 126). It will be appreciated that this is not intended to be limiting, and that the scope of this disclosure includes embodiments in which the wireless device 120 and the base station 110 may be operatively linked via some other communication medium.

Electronic storage 424 may include non-transitory storage media that electronically stores information. The electronic storage media of electronic storage 424 may include one or both of system storage that is provided integrally (i.e., substantially non-removable) with wireless device 120 and/or removable storage that is removably connectable to wireless device 120 via, for example, a port (e.g., a universal serial bus (USB) port, a firewire port, etc.) or a drive (e.g., a disk drive, etc.). Electronic storage 424 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 424 may include one or more virtual storage resources (e.g., cloud storage, a virtual private network, and/or other virtual storage resources). Electronic storage 424 may store software algorithms, information determined by processor(s) 426, information received from wireless device 120, information received from base station 110, and/or other information that enables wireless device 120 to function as described herein.

Processor(s) 426 may be configured to provide information processing capabilities in wireless device 120. As such, the processor(s) 426 may include one or more of a digital processor, an analog processor, a digital circuit designed to process information, an analog circuit designed to process information, a state machine, and/or other mechanisms for electronically processing information. Although the processor(s) 426 is shown in FIG. 4 as a single entity, this is for illustrative purposes only. In some implementations, the processor(s) 426 may include a plurality of processing units and/or processor cores. The processing units may be physically located within the same device, or processor(s) 426 may represent processing functionality of a plurality of devices operating in coordination. The processor(s) 426 may be configured to execute modules 408-416 and/or other modules by software; hardware; firmware; some combination of software, hardware, and/or firmware; and/or other mechanisms for configuring processing capabilities on processor(s) 426. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408-416 are illustrated in FIG. 4 as being implemented within a single processing unit, in implementations in which the processor(s) 426 includes multiple processing units and/or processor cores, one or more of modules 408-416 may be implemented remotely from the other modules. The description of the functionality provided by the different modules 408-416 described below is for illustrative purposes, and is not intended to be limiting, as any of modules 408-416 may provide more or less functionality than is described. For example, one or more of the modules 408-416 may be eliminated, and some or all of its functionality may be provided by other modules 408-416. As another example, the processor(s) 426 may be configured to execute one or more additional modules that may perform some or all of the functionality attributed below to one of the modules 408-416.

Figure 5:
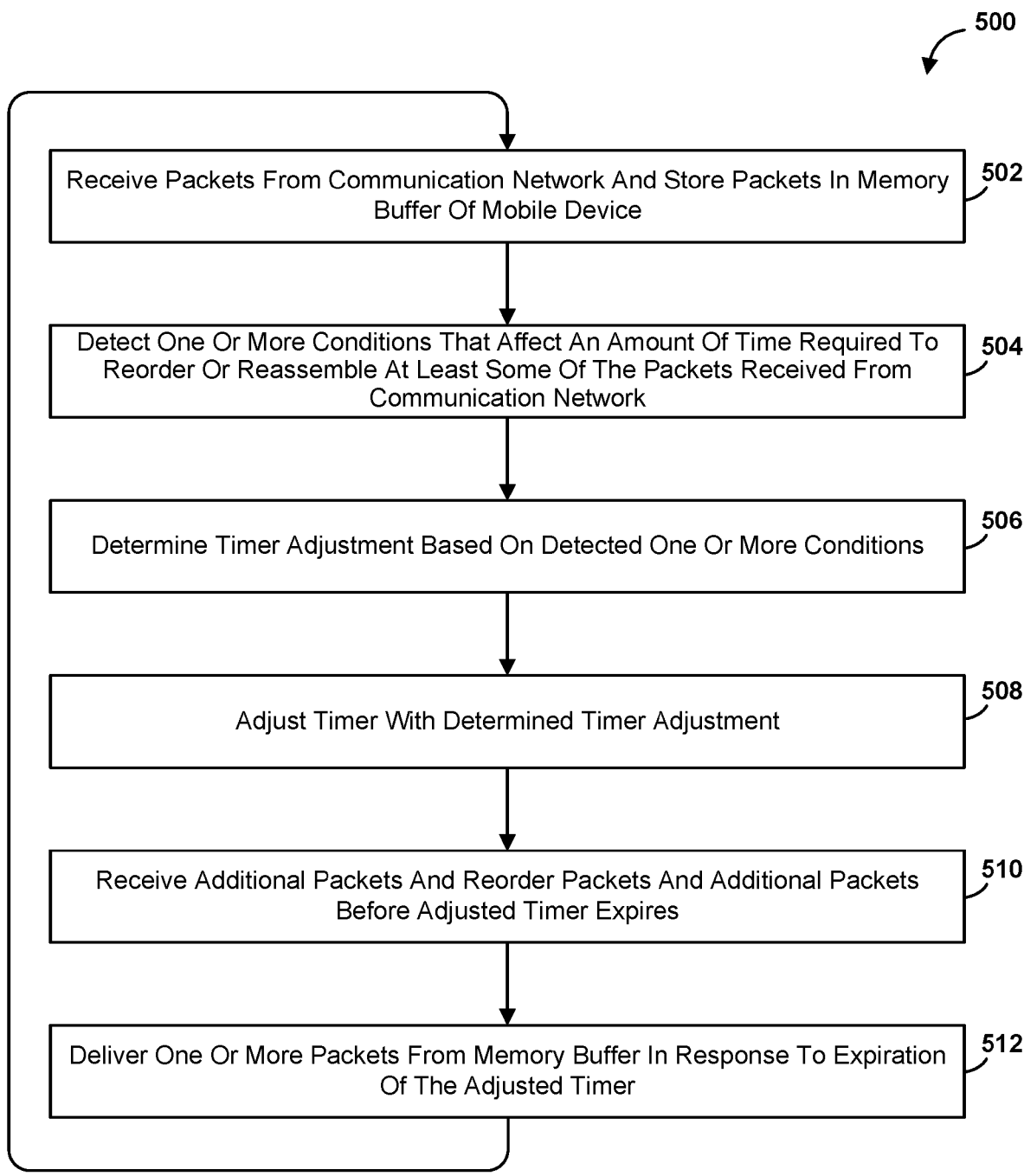
FIG. 5 is a process flow diagram illustrating operations of a method for managing a reordering timer performed by a processor of a wireless device according to various embodiments.

FIG. 5 shows a process flow diagram of a method 500 of managing a reordering timer in accordance with various embodiments. With reference to FIGS. 1-5, the method 500 may be implemented by a processor (such as 212, 216, 252 or 260, 426) of a wireless device 120 (such as the wireless device 120a-120e, 200, 120).

In block 502, the processor may receive packets from a communication network and store the packets in a memory buffer of the wireless device. In some embodiments, the processor may receive the packets from one or more sources, such as different RLC/MAC entities. In some embodiments, the processor may store the packets in a reordering buffer, which may be a PDCP reordering buffer. In some embodiments, the processor may receive partial or fragmentary packets and may store the partial or fragmentary packets in the reordering buffer. Means for performing functions of the operations in block 502 may include the processor (e.g., 210, 212, 214, 216, 218, 252, 260, 426) and the wireless transceiver (e.g., 266).

In block 504, the processor may detect one or more conditions that affect an amount of time required to reorder or reassemble at least some of the packets received from the communication network. In various embodiments, the one or more conditions may include a variety of operational conditions of the wireless device or conditions of the wireless communication link between the wireless device and a base station that are determined by the wireless device. Means for performing functions of the operations in block 504 may include the processor (e.g., 210, 212, 214, 216, 218, 252, 260, 426) and the wireless transceiver (e.g., 266).

In block 506, the processor may determine a timer adjustment based on the detected one or more conditions. In some embodiments, the processor may determine a timer adjustment that lengthens or that shortens a network-determined timer. Means for performing functions of the operations in block 506 may include the processor (e.g., 210, 212, 214, 216, 218, 252, 260, 426).

In some embodiments, the processor may determine the timer adjustment based on historical condition information and the detected one or more conditions. For example, the processor may store in memory historical condition information as well as one or more detected conditions. In some embodiments, the processor may store in memory one or more previously-determined or historical timer adjustments. In some embodiments, the processor may determine the current timer adjustment based at least in part on historical condition information or historical timer adjustments. In some embodiments, the processor may determine the current timer adjustment based on a weighted average of a number of historical timer adjustments.

In block 508, the processor may adjust a timer with the determined timer adjustment. In some embodiments, the reordering buffer (such as the PDCP reordering buffer) may be configured to hold one or more packets during the duration of the adjusted timer. Means for performing functions of the operations in block 508 may include the processor (e.g., 210, 212, 214, 216, 218, 252, 260, 426).

In block 510, the processor may receive additional packets and reorder the packets and the additional packets before the adjusted timer expires. In some embodiments, reordering the packets may include reassembling packets that were received as partial or fragmented packets and stored in the reordering buffer. In such embodiments, the processor may receive additional data for partial or fragmented packets and reassemble the packets using the additional data before the adjusted timer expires. Means for performing functions of the operations in block 510 may include the processor (e.g., 210, 212, 214, 216, 218, 252, 260, 426) and the wireless transceiver (e.g., 266).

In block 512, the processor may deliver one or more packets from the memory buffer in response to expiration of the timer. In some embodiments, the one or more packets may include one or more packets in one or more additional packets. In some embodiments, when or after the adjusted timer expires, the wireless device processor may deliver one or more packets from the memory buffer, for example, to a higher layer of the radio protocol stack, such as the radio resource control (RRC) and user plane layers. Means for performing functions of the operations in block 512 may include the processor (e.g., 210, 212, 214, 216, 218, 252, 260, 426).

Figure 6:
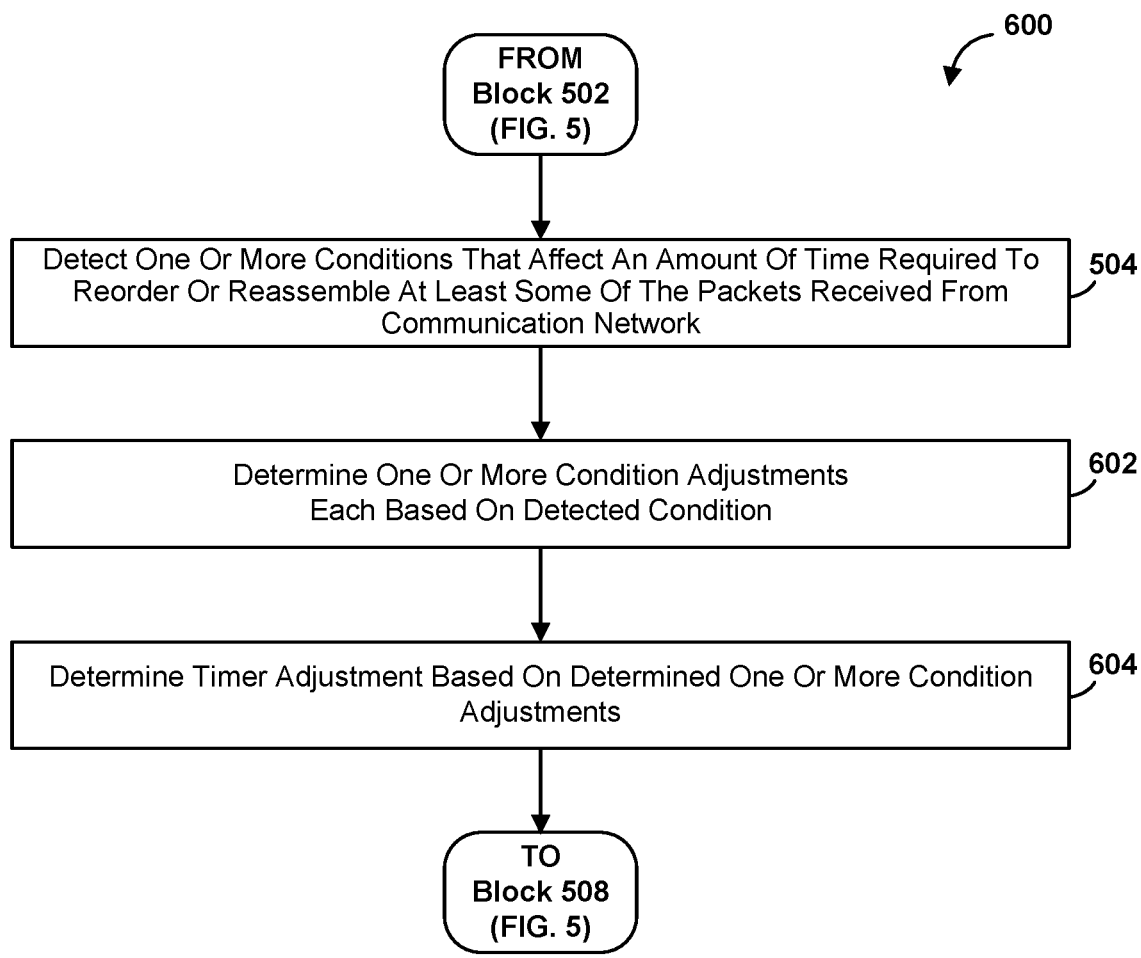
FIG. 6 is a process flow diagram illustrating operations of a method for managing a reordering timer performed by a processor of a wireless device according to various embodiments.

FIG. 6 shows a process flow diagram of a method 600 of managing a reordering timer in accordance with various embodiments. With reference to FIGS. 1-6, the method 600 may be implemented by a processor (such as 212, 216, 252 or 260, 426) of a wireless device 120 (such as the wireless device 120a-120e, 200).

Following the operations of block 502 (FIG. 5), the processor may detect one or more conditions that affect an amount of time required to reorder at least some of the packets received from the communication network in block 504 as described.

In block 602, the processor may determine one or more condition adjustments. In some embodiments, the processor may determine each condition adjustment based on a detected condition. In some embodiments, the processor may detect a plurality of conditions, each of which may increase or decrease an amount of time that the processor requires to perform packet reordering and/or reassembly of at least some of the packets received from the communication network. In some embodiments, the processor may consider each detected condition as a factor in determining the timer adjustment. In such embodiments, the processor may determine each condition adjustment based on a detected condition, and each condition adjustment may individually increase or decrease the timer adjustment. Means for performing functions of the operations in block 602 may include the processor (e.g., 210, 212, 214, 216, 218, 252, 260, 426).

In block 604, the processor may determine the timer adjustment based on the determined one or more condition adjustments. In some embodiments, the processor may consider the one or more condition adjustments in combination, and may, for example, determine a sum, product, average, weighted average, or another suitable combination of the one or more condition adjustments. In some embodiments, the processor may determine the timer adjustment based on the combination of the determined one or more condition adjustments. Means for performing functions of the operations in block 604 may include the processor (e.g., 210, 212, 214, 216, 218, 252, 260, 426).

The processor may then adjust the timer with the determined timer adjustment in block 508 as described.

FIGS. 7A-7G are process flow diagrams illustrating operations 702a-702g that may be performed as part of a method for allocating computing resources to an application in accordance with various embodiments. With reference to FIGS. 1-7G, the operations 702a-702g may be performed by a processor (such as 212, 216, 252 or 260, 426) of a wireless device 120 (such as the wireless device 120a-120e, 200).

Figure 7A:
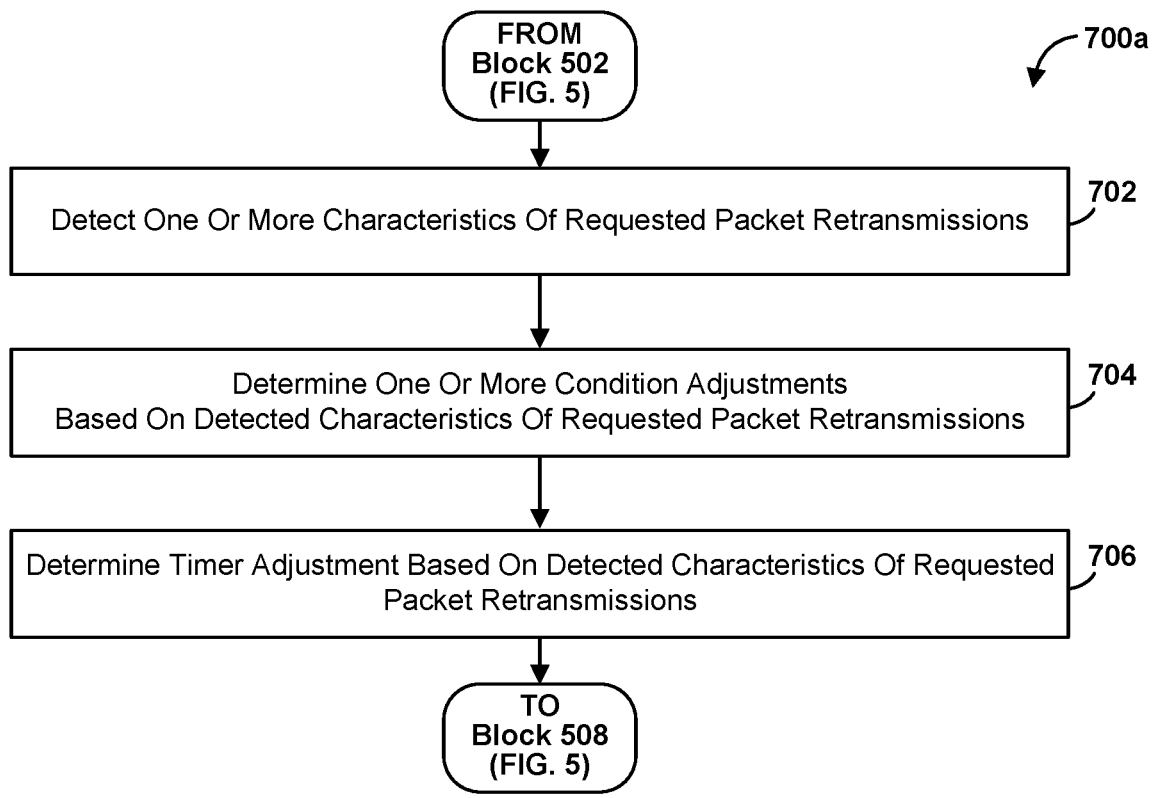
FIGS. 7A-7G are process flow diagrams illustrating operations that may be performed by a processor of a wireless device as part of a method for managing a reordering timer according to various embodiments.

With reference to FIG. 7A, following the operations of block 502 (FIG. 5), the processor may detect one or more characteristics of requested packet retransmissions in block 702. For example, the wireless device processor may detect that the wireless device has requested one or more packet retransmissions, such as through an automatic repeat request (ARQ) or hybrid ARQ (HARQ) procedure. In some embodiments, the wireless device processor may determine, for example, a number of retransmissions requested, a number of retransmitted packets received, an amount of block error rate (BLER), the length of a transmission time interval (TTI) of a carrier performing retransmission, and a type of duplexing used by the retransmitting carrier (e.g., frequency division duplexing (FDD) or time division duplexing (TDD)).

In block 704, the processor may determine one or more condition adjustments based on the detected characteristics of the requested packet retransmissions. For example, the processor may detect that the wireless device has requested one or more packet retransmissions, such as through an ARQ or HARQ procedure. In such case, processor may determine a condition adjustment that increases the timer. In some embodiments, the processor may determine an amount of the condition adjustment dynamically. In some embodiments, the wireless device processor may determine the amount of the condition adjustment based on a number of retransmissions requested. In some embodiments, the wireless device processor may determine the amount of the condition adjustment based on a number of retransmitted packets received. In some embodiments, the wireless device processor may determine the amount of the condition adjustment based on an amount of BLER. In some embodiments, the wireless device processor may determine the amount of the condition adjustment based on a length of a TTI of a carrier performing retransmission. In some embodiments, the wireless device processor may determine the amount of the condition adjustment based on a type of duplexing (e.g., FDD or TDD) used by the retransmitting carrier (in which TDD carriers may require more time for packet reordering than FDD carriers).

In block 706, the processor may determine the timer adjustment based on the detected characteristics of the requested packet retransmissions.

The processor may then perform the operations of block 508 (FIG. 5) as described.

Figure 7B:
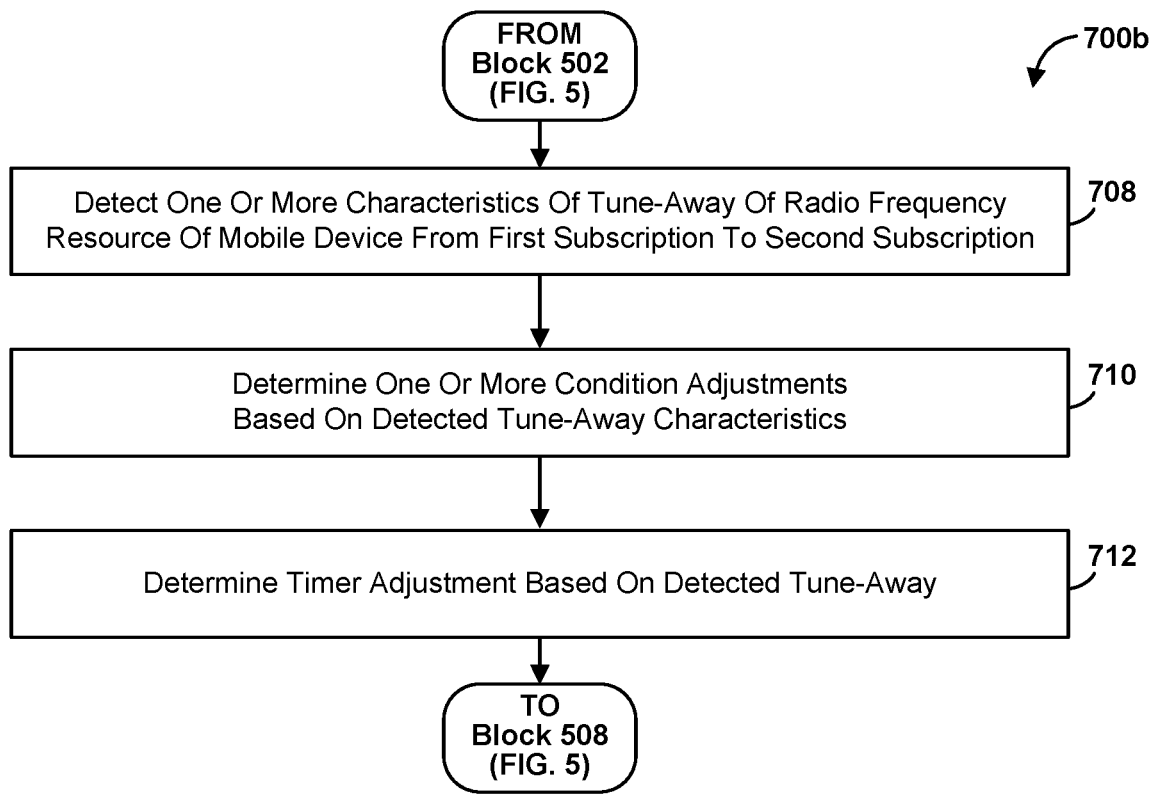

With reference to FIG. 7B, following the operations of block 502 (FIG. 5), the processor may detect one or more characteristics of a two-away of a radio frequency resource of the wireless device from a first subscription to a second subscription in block 708.

In block 710, the processor may determine one or more condition adjustments based on the detected characteristics of the tune-away. In some embodiments, the wireless device processor may determine a type of operation to be performed during the tune-away. In some embodiments, different types of operations may require, or may be scheduled for, a different period of time during the tune-away. In some embodiments, the wireless device processor may determine the amount of the condition adjustment based on the type of operation performed during the tune-away. For example, the wireless device processor may perform the tune-away to perform page decoding, which may require a relatively short time period to perform. As another example, performing measurements (such as signal strength, signal quality, and other suitable measurements) on the second subscription may require a relatively longer period of time than page decoding. As another example, performing Non-Access Stratum (NAS) procedures (such as IDLE mode procedures, or to report a tracking area update) on the second subscription may require a relatively longer period of time than performing measurements on the second subscription. In some embodiments, the wireless device processor may determine a radio access technology (RAT) of the second subscription. In some embodiments, the protocols and processes of different RATs (e.g., GSM, LTE, NR) may affect a length of the tune away.

In block 712, the processor may determine the timer adjustment based on the detected characteristics of the tune-away of the radio frequency resource.

The processor may then perform the operations of block 508 (FIG. 5) as described.

Figure 7C:
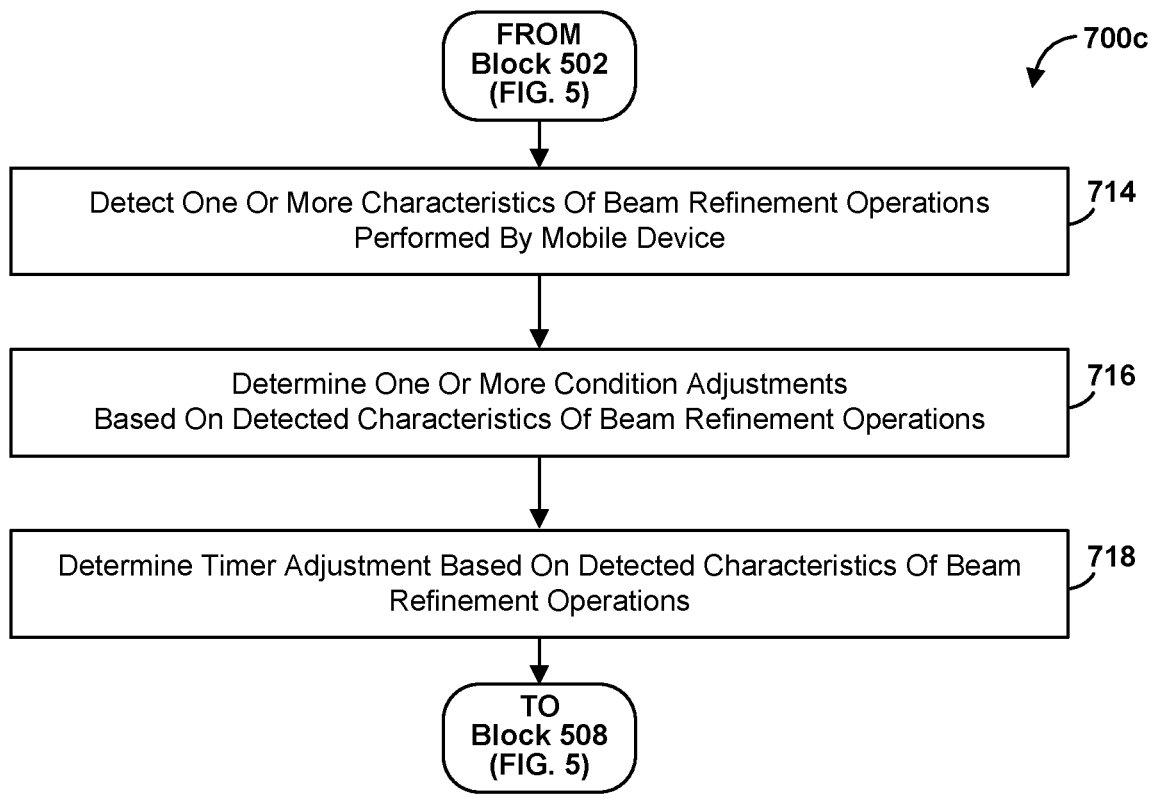

With reference to FIG. 7C, following the operations of block 502 (FIG. 5), the processor may detect one or more characteristics of beam refinement operations performed by the mobile device in block 714.

In block 716, the processor may determine one or more condition adjustments based on the detected characteristics of the beam refinement operations. In some embodiments, the wireless device processor may determine whether the wireless device is performing beam refinement operations. In some embodiments, performing beam refinements may result in downlink scheduling delays, and the wireless device processor may require a longer period of time to perform packet reordering. In some embodiments, the wireless device processor may determine the amount of the condition adjustment based on whether the wireless device is performing beam refinement operations. In some embodiments, the wireless device processor may determine a number of beam refinements performed by the wireless device. In some embodiments, the wireless device processor may determine the amount of the condition adjustment based on the determined number of beam refinements performed by the wireless device.

In block 718, the processor may determine the timer adjustment based on the detected characteristics of the beam refinement operations performed by the wireless device.

The processor may then perform the operations of block 508 (FIG. 5) as described.

Figure 7D:
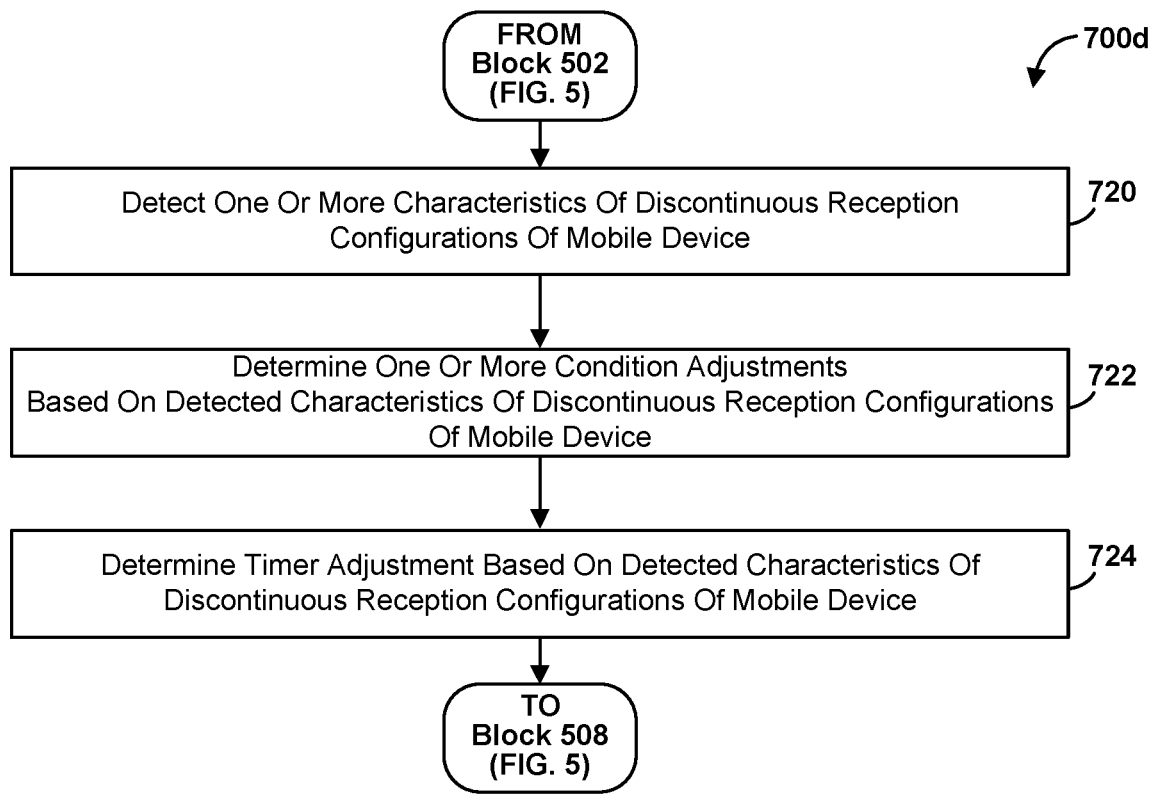

With reference to FIG. 7D, following the operations of block 502 (FIG. 5), the processor may detect one or more characteristics of DRX configurations of the wireless device in block 720.

In block 722, the processor may determine one or more condition adjustments based on the detected one or more characteristics of DRX configurations of the wireless device. In some embodiments, the processor may determine a DRX cycle length. In some embodiments, the processor may determine the one or more condition adjustments based on the determined DRX cycle length. In some embodiments, the wireless device processor may determine a RAT of the communication link. In some embodiments, the processor may determine the one or more condition adjustments based on the RAT of the communication link on which DRX is being performed.

In block 724, the processor may determine the timer adjustment based on the detected characteristics of discontinuous reception configurations of the wireless device.

The processor may then perform the operations of block 508 (FIG. 5) as described.

Figure 7E:
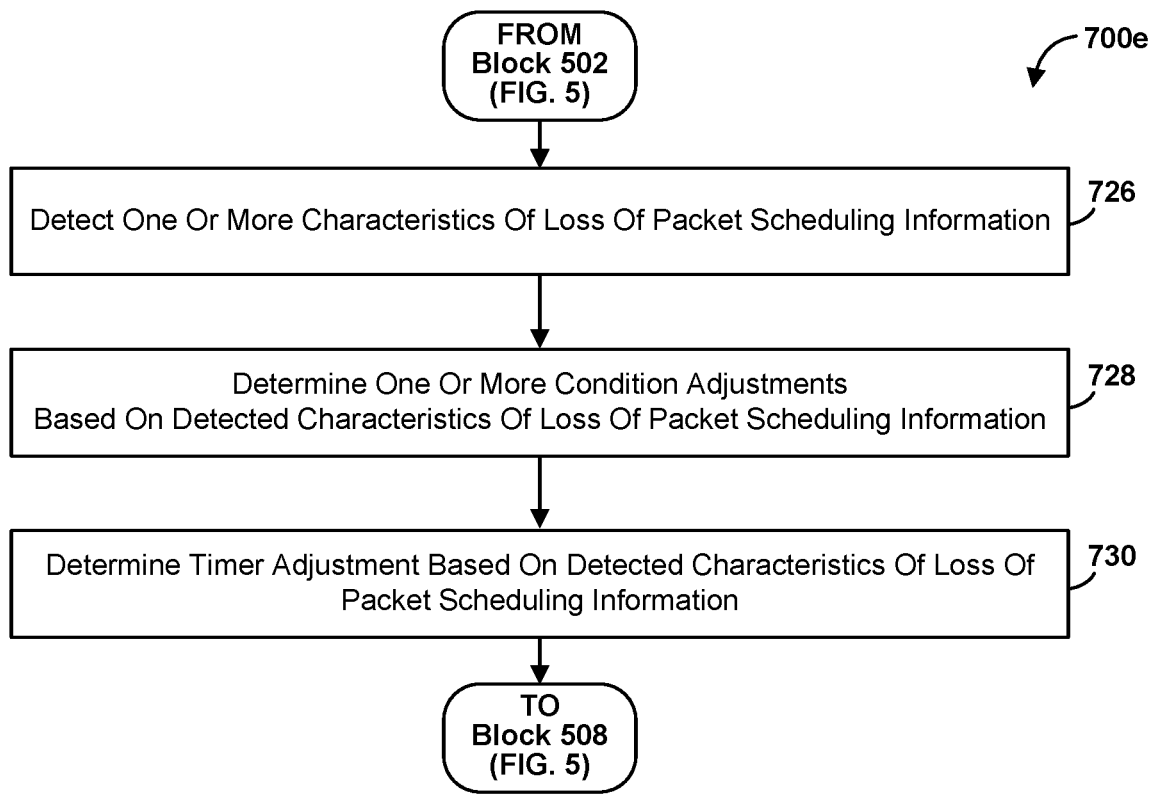

With reference to FIG. 7E, following the operations of block 502 (FIG. 5), the processor may detect one or more characteristics of a loss of packet scheduling information in block 726.

In block 728, the processor may determine one or more condition adjustments based on the detected loss of packet scheduling information. In some embodiments, the processor may briefly lose, or may not receive for some period of time, scheduling information from a base station. Causes of scheduling information loss may vary, such as degradation or variation in channel quality, or because of momentary variation in channel quality information (CQI). In some embodiments, the processor may require additional time to recover missed or lost scheduling information. In such cases, the processor may determine a condition adjustment that may increase the timer adjustment.

In block 730, the processor may determine the timer adjustment based on the detected characteristics of the loss of packet scheduling information.

The processor may then perform the operations of block 508 (FIG. 5) as described.

Figure 7F:
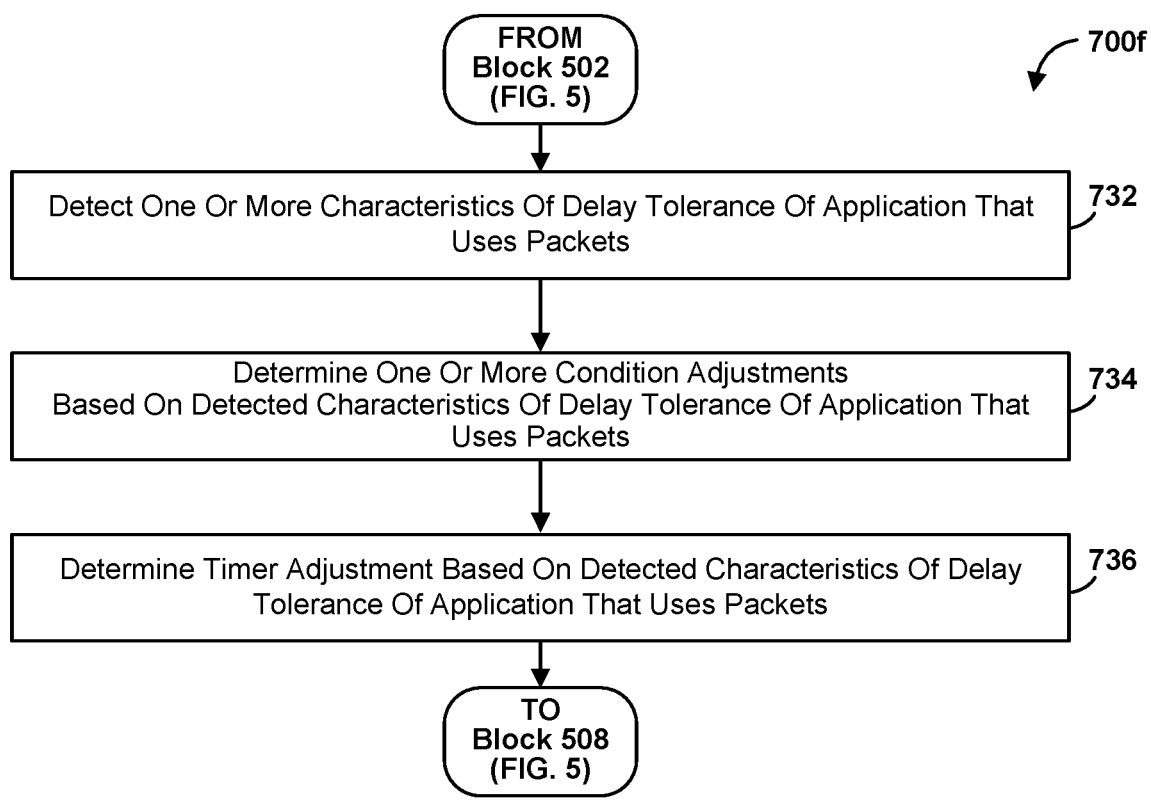

With reference to FIG. 7F, following the operations of block 502 (FIG. 5), the processor may detect one or more characteristics of a delay tolerance of an application that uses the packets in block 732.

In block 734, the processor may determine one or more condition adjustments based on the detected characteristics of the delay tolerance of the application that use the packets. For example, some applications, such as voice over Internet Protocol (VoIP), media streaming applications, and games, are highly delay sensitive (that is, are not delay tolerant), and packet latency may cause the performance of such applications to degrade. As another example, applications such as a web browser and social media applications may be relatively delay tolerant, such that their performance may not be substantially affected by packet delay or latency. Thus, an application executing on the wireless device (such as a user application) may be more, or less, tolerant of packet delay or packet latency than the network-configured timer. In some embodiments, the processor may determine one or more condition adjustments to increase, or to decrease, the timer adjustment based on the delay tolerance of the application. In some embodiments, the processor may determine the one or more condition adjustments based on a comparison of the delay tolerance of the application to a network-indicated (or a default) timer. For example, the processor may increase the one or more condition adjustments in response to determining that the application may tolerate a greater delay of packet delivery or a greater amount of packet latency than provided by the network-indicated or default timer. Similarly, the processor may decrease the condition adjustment(s) in response to determining that the application may tolerate less packet delay or latency than provided by the network-indicated or default timer. In some embodiments, the processor may determine an amount of packet delay, packet latency, BLER, or another suitable measurement of packet delay that the application may tolerate. In some embodiments, the processor may determine the condition adjustment(s) based on the detected amount of packet delay, packet latency, BLER, and/or other measurement of packet delay.

In block 736, the processor may determine the timer adjustment based on the detected characteristics of the delay tolerance of the application that uses the packets.

The processor may then perform the operations of block 508 (FIG. 5) as described.

Figure 7G:
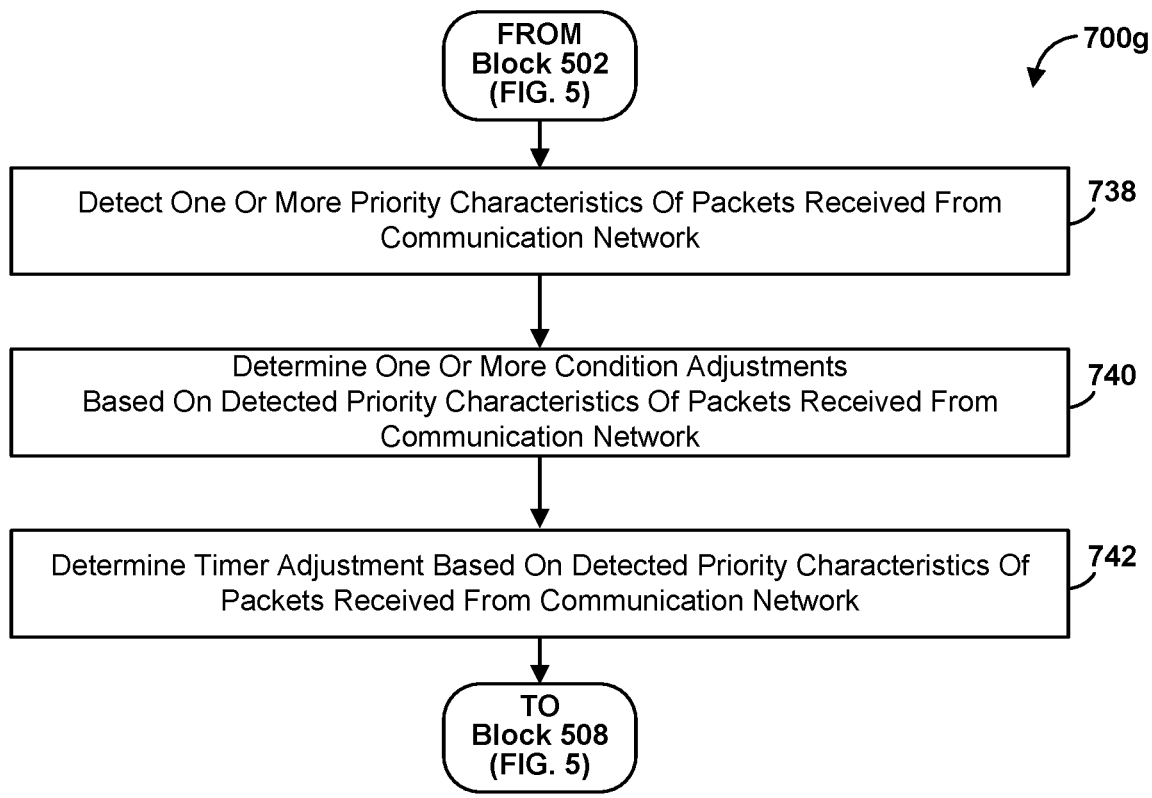

With reference to FIG. 7G, following the operations of block 502 (FIG. 5), the processor may detect one or more priority characteristics of packets received from the communication network in block 738.

In block 740, the processor may determine one or more condition adjustments based on the detected priority characteristics of the packets received from the communication network. In some embodiments, the wireless device processor may detect that one or more packets received from the communication network are high priority packets. For example, the wireless device processor may detect packet priority characteristics in a packet header, in control signaling received from the base station, in other information associated with the packets (such as metadata), or in other information received from the communication network. In some embodiments, based on the receipt of high-priority or high importance packets, the wireless device processor may increase the timer adjustment.

In block 742, the processor may determine the timer adjustment based on the detected priority characteristics of the packets received from the communication network.

The processor may then perform the operations of block 508 (FIG. 5) as described.

Figure 8:
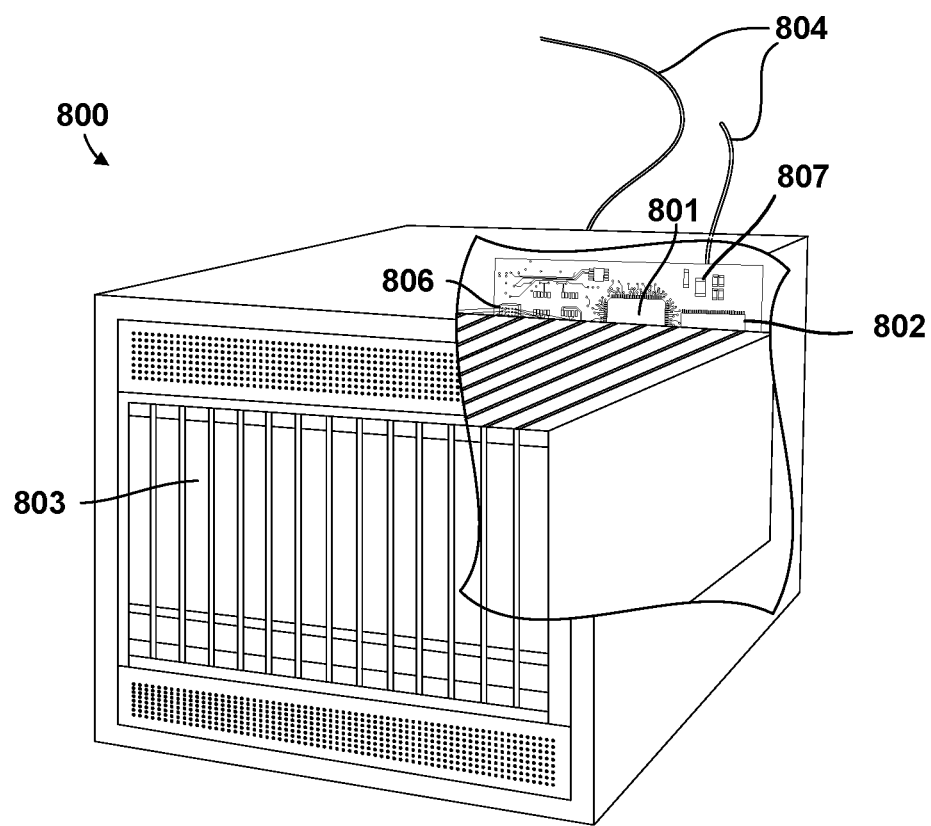
FIG. 8 is a component block diagram of a wireless router device suitable for managing a reordering timer performed by a processor of a wireless device in accordance with various embodiments.

Various embodiments may be implemented on a variety of wireless network devices, an example of which is illustrated in FIG. 8 in the form of a wireless network computing device 800 functioning as a network element of a communication network, such as a base station. Such network computing devices may include at least the components illustrated in FIG. 8. With reference to FIGS. 1-8, the network computing device 800 may typically include a processor 801 coupled to volatile memory 802 and a large capacity nonvolatile memory, such as a disk drive 803. The network computing device 800 may also include a peripheral memory access device such as a floppy disc drive, compact disc (CD) or digital video disc (DVD) drive 806 coupled to the processor 801. The network computing device 800 may also include network access ports 804 (or interfaces) coupled to the processor 801 for establishing data connections with a network, such as the Internet and/or a local area network coupled to other system computers and servers. The network computing device 800 may include one or more antennas 807 for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
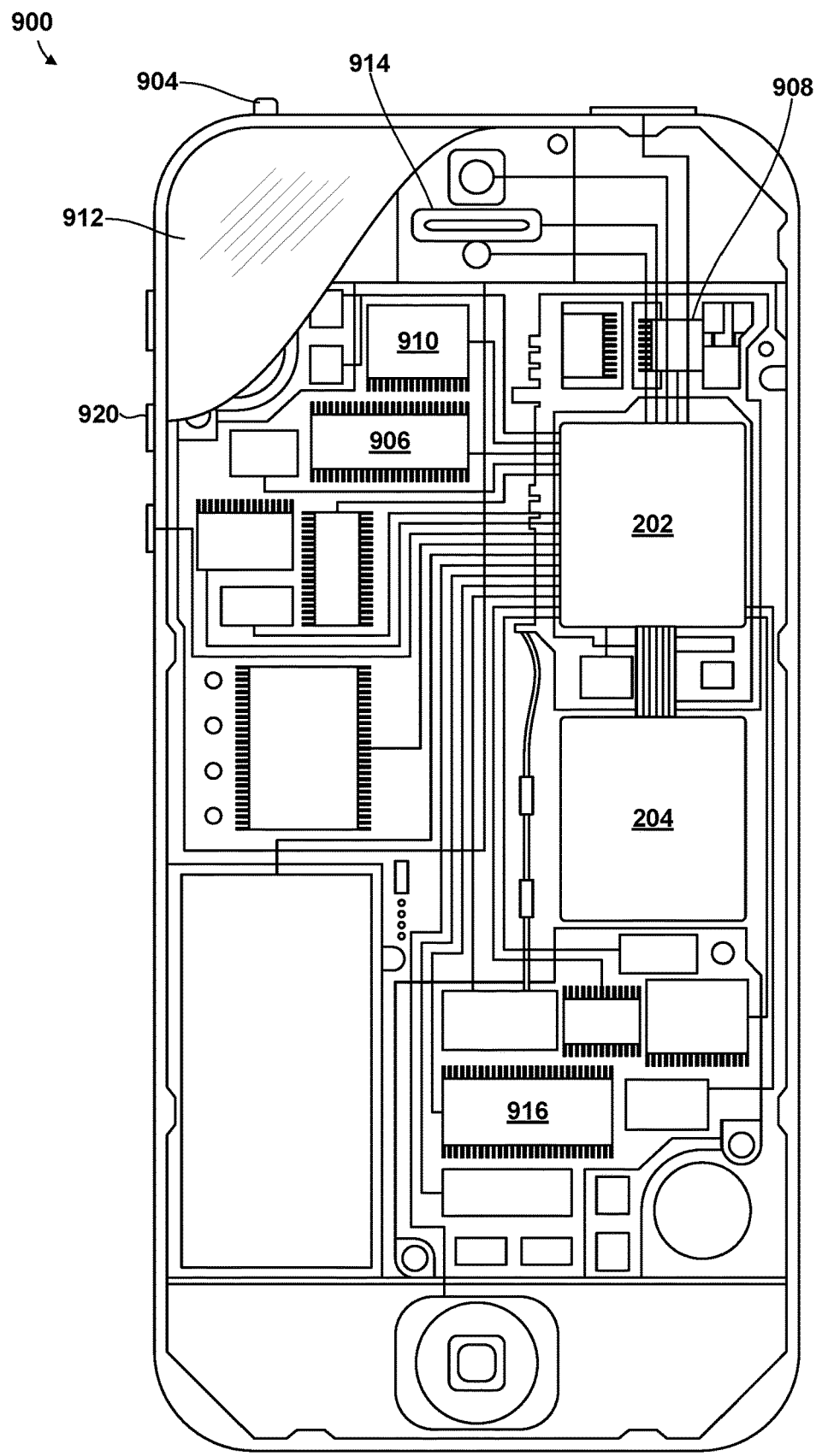
FIG. 9 is a component block diagram of a wireless communication device suitable for managing a reordering timer performed by a processor of a wireless device in accordance with various embodiments.

Various embodiments may be implemented on a variety of wireless devices 120 (e.g., the wireless device 120a-120e, 200), an example of which is illustrated in FIG. 9 in the form of a smartphone 900. The smartphone 900 may include a first SOC 202 (e.g., a SOC-CPU) coupled to a second SOC 204 (e.g., a 5G capable SOC). The first and second SOCs 202, 204 may be coupled to internal memory 906, 916, a display 912, and to a speaker 914. Additionally, the smartphone 900 may include an antenna 904 for sending and receiving electromagnetic radiation that may be connected to a wireless data link and/or cellular telephone transceiver 908 coupled to one or more processors in the first and/or second SOCs 202, 204. Smartphones 900 typically also include menu selection buttons or rocker switches 920 for receiving user inputs.

A typical smartphone 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 908 and CODEC 910 may include a digital signal processor (DSP) circuit (not shown separately).

The processors of the wireless network computing device 800 and the smart phone 900 may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Typically, software applications may be stored in the memory 906, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600, and 700a-700g may be substituted for or combined with one or more operations of the methods 500, 600, and 700a-700g.

Implementation examples are described in the following paragraphs. While some of the following implementation examples are described in terms of example methods, further example implementations may include: the example methods discussed in the following paragraphs implemented by a base station including a processor configured with processor-executable instructions to perform operations of the methods of the following implementation examples; the example methods discussed in the following paragraphs implemented by a base station including means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 1

A method of managing a reordering timer performed by a processor of a wireless device, including receiving packets from a communication network and storing the packets in a memory buffer of the wireless device; detecting one or more conditions that affect an amount of time required to reorder or reassemble at least some of the packets received from the communication network; determining a timer adjustment based on the detected one or more conditions; adjusting a timer with the determined timer adjustment; and delivering one or more packets from the memory buffer in response to expiration of the adjusted timer.

Example 2

The method of example 1, in which the conditions that affect an amount of time required to reorder and reassemble packets received from the communication network includes one or more operational conditions of the wireless device.

Example 3

The method of any of examples 1 and 2, in which the conditions that affect an amount of time required to reorder and reassemble packets received from the communication network includes one or more conditions of a wireless communication link between the wireless device and the communication network.

Example 4

The method of any of examples 1-3, in which the conditions that affect an amount of time required to reorder and reassemble packets received from the communication network includes one or more of a characteristic of packet retransmissions requested by the wireless device; a characteristic of a tune-away of a radio frequency resource of the wireless device from a first subscription to a second subscription; a characteristic of beam refinement operations performed by the wireless device; a characteristic of discontinuous reception (DRX) configurations of the wireless device; a characteristic of a delay tolerance of an application that uses the packets; a characteristic of the packets received from the communication network; and a characteristic of a loss of packet scheduling information.

Example 5

The method of any of examples 1-4, in which determining a timer adjustment based on the detected one or more conditions includes determining the timer adjustment based on historical condition information.

Example 6

The method of any of examples 1-5, in which the timer is a network-determined timer, the method further including receiving the network determined timer via a control signal from the network.

Example 7

The method of any of examples 1-6, further including: determining one or more condition adjustments in which each condition adjustment is based on a detected condition; in which determining the timer adjustment based on the detected one or more conditions includes determining the timer adjustment based on the determined one or more condition adjustments.

Example 8

The method of any of examples 1-7, further including: receiving additional packets and reordering the packets and the additional packets before the adjusted timer expires.

Example 9

The method of any of examples 1-8, in which: detecting one or more conditions that affect an amount of time required to reorder at least some of the packets received from the communication network includes detecting one or more characteristics of requested packet retransmissions; and determining a timer adjustment based on the detected one or more conditions includes determining the timer adjustment based on the detected characteristics of the requested packet retransmissions.

Example 10

The method of any of examples 1-8, in which: detecting one or more conditions that affect an amount of time required to reorder at least some of the packets received from the communication network includes detecting one or more characteristics of a tune-away of a radio frequency resource of the wireless device from a first subscription to a second subscription; and determining a timer adjustment based on the detected one or more conditions includes determining the timer adjustment based on the detected characteristics of the tune-away of the radio frequency resource.

Example 11

The method of any of examples 1-8, in which: detecting one or more conditions that affect an amount of time required to reorder at least some of the packets received from the communication network includes detecting one or more characteristics of beam refinement operations performed by the wireless device; and determining a timer adjustment based on the detected one or more conditions includes determining the timer adjustment based on the detected characteristics of the beam refinement operations performed by the wireless device.

Example 12

The method of any of examples 1-8, in which: detecting one or more conditions that affect an amount of time required to reorder at least some of the packets received from the communication network includes detecting one or more characteristics of discontinuous reception configurations of the wireless device; and determining a timer adjustment based on the detected one or more conditions includes determining the timer adjustment based on the detected characteristics of discontinuous reception configurations of the wireless device.

Example 13

The method of any of examples 1-8, in which: detecting one or more conditions that affect an amount of time required to reorder at least some of the packets received from the communication network includes detecting one or more characteristics of a loss of packet scheduling information; and determining a timer adjustment based on the detected one or more conditions includes determining the timer adjustment based on the detected characteristics of the loss of packet scheduling information.

Example 14

The method of any of examples 1-8, in which: detecting one or more conditions that affect an amount of time required to reorder at least some of the packets received from the communication network includes detecting one or more characteristics of a delay tolerance of an application that uses the packets; and determining a timer adjustment based on the detected one or more conditions includes determining the timer adjustment based on the detected characteristics of the delay tolerance of the application that uses the packets.

Example 15

The method of any of examples 1-8, in which: detecting one or more conditions that affect an amount of time required to reorder at least some of the packets received from the communication network includes detecting one or more priority characteristics of the packets received from the communication network; and determining a timer adjustment based on the detected one or more conditions includes determining the timer adjustment based on the detected priority characteristics of the packets received from the communication network.

Example 16

The method of any of examples 1-15, in which determining a timer adjustment based on the detected one or more conditions includes determining a timer adjustment based on historical condition information and the detected one or more conditions.

Example 17

A wireless device including a processor configured with processor-executable instructions to perform operations of the methods of any of examples 1-16.

Example 18

A wireless device including means for performing functions of the methods of any of examples 1-16.

Example 19

A non-transitory processor-readable medium having stored thereon processor-executable instruction configured to cause a processing device in a wireless device to perform operations of the method of any of examples 1-16.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of managing a reordering timer performed by a processor of a wireless device, comprising:
    receiving packets from a communication network and storing the packets in a Packet Data Convergence Protocol (PDCP) reordering buffer of the wireless device;
    detecting one or more conditions that affect an amount of time required to reorder or reassemble at least some of the packets received from the communication network, the detected one or more conditions including a characteristic of at least one or more of:
        a tune-away of a radio frequency resource of the wireless device from a first subscription to a second subscription;
        a characteristic of beam refinement operations performed by the wireless device; or
        a characteristic of discontinuous reception configurations of the wireless device;
    determining a timer adjustment based on the detected one or more conditions;
    adjusting a timer with the determined timer adjustment; and
    delivering one or more packets from the PDCP reordering buffer in response to expiration of the adjusted timer.

2. The method of claim 1, wherein conditions that affect the amount of time required to reorder and reassemble packets received from the communication network comprise one or more operational conditions of the wireless device.

3. The method of claim 1, wherein conditions that affect the amount of time required to reorder and reassemble packets received from the communication network comprise one or more conditions of a wireless communication link between the wireless device and the communication network.

4. The method of claim 1, wherein conditions that affect the amount of time required to reorder and reassemble packets received from the communication network comprise one or more of:
    a characteristic of packet retransmissions requested by the wireless device;
    a characteristic of a delay tolerance of an application that uses the packets;
    a characteristic of the packets received from the communication network; or
    a characteristic of a loss of packet scheduling information.

5. The method of claim 1, wherein determining the timer adjustment based on the detected one or more conditions comprises determining the timer adjustment based on historical condition information.

6. The method of claim 1, wherein the timer is a network-determined timer, the method further comprising receiving the network determined timer via a control signal from the network.

7. The method of claim 1, further comprising:
    determining one or more condition adjustments, wherein each condition adjustment is based on a detected condition,
    wherein determining the timer adjustment based on the detected one or more conditions comprises determining the timer adjustment based on the determined one or more condition adjustments.

8. The method of claim 1, further comprising:
    receiving additional packets and reordering the packets and the additional packets before the adjusted timer expires.

9. The method of claim 1, wherein:
    detecting one or more conditions that affect the amount of time required to reorder at least some of the packets received from the communication network further comprises detecting one or more characteristics of requested packet retransmissions; and
    determining the timer adjustment based on the detected one or more conditions comprises determining the timer adjustment based on the detected characteristics of the requested packet retransmissions.

10. The method of claim 1, wherein:
    detecting one or more conditions that affect the amount of time required to reorder at least some of the packets received from the communication network comprises detecting the characteristic of the tune-away of the radio frequency resource of the wireless device from the first subscription to the second subscription; and
    determining the timer adjustment based on the detected one or more conditions comprises determining the timer adjustment based on the detected characteristic of the tune-away of the radio frequency resource.

11. The method of claim 1, wherein:
    detecting one or more conditions that affect the amount of time required to reorder at least some of the packets received from the communication network comprises detecting the characteristic of beam refinement operations performed by the wireless device; and
    determining the timer adjustment based on the detected one or more conditions comprises determining the timer adjustment based on the detected characteristic of the beam refinement operations performed by the wireless device.

12. The method of claim 1, wherein:
    detecting one or more conditions that affect the amount of time required to reorder at least some of the packets received from the communication network comprises detecting the characteristic of discontinuous reception configurations of the wireless device; and
    determining the timer adjustment based on the detected one or more conditions comprises determining the timer adjustment based on the detected characteristic of discontinuous reception configurations of the wireless device.

13. The method of claim 1, wherein:
detecting one or more conditions that affect the amount of time required to reorder at least some of the packets received from the communication network comprises detecting one or more characteristics of a loss of packet scheduling information; and
determining the timer adjustment based on the detected one or more conditions comprises determining the timer adjustment based on the detected characteristics of the loss of packet scheduling information.

14. The method of claim 1, wherein:
detecting one or more conditions that affect the amount of time required to reorder at least some of the packets received from the communication network comprises detecting one or more characteristics of a delay tolerance of an application that uses the packets; and
determining a timer adjustment based on the detected one or more conditions comprises determining the timer adjustment based on the detected characteristics of the delay tolerance of the application that uses the packets.

15. The method of claim 1, wherein:
detecting one or more conditions that affect the amount of time required to reorder at least some of the packets received from the communication network comprises detecting one or more priority characteristics of the packets received from the communication network; and
determining a timer adjustment based on the detected one or more conditions comprises determining the timer adjustment based on the detected priority characteristics of the packets received from the communication network.

16. The method of claim 1, wherein determining the timer adjustment based on the detected one or more conditions comprises determining a timer adjustment based on historical condition information and the detected one or more conditions.

17. A wireless device, comprising:
a processor configured with processor-executable instructions to:
receive packets from a communication network and storing the packets in a Packet Data Convergence Protocol (PDCP) reordering buffer of the wireless device;
detect one or more conditions that affect an amount of time required to reorder or reassemble at least some of the packets received from the communication network, the detected one or more conditions including a characteristic of at least one or more of:
a tune-away of a radio frequency resource of the wireless device from a first subscription to a second subscription;
a characteristic of beam refinement operations performed by the wireless device; or
a characteristic of discontinuous reception configurations of the wireless device;
determine a timer adjustment based on the detected one or more conditions;
adjust a timer with the determined timer adjustment; and
deliver one or more packets from the PDCP reordering buffer in response to expiration of the timer.

18. The wireless device of claim 17, wherein the processor is further configured with processor-executable instructions such that the conditions that affect the amount of time required to reorder and reassemble packets received from the communication network comprise one or more operational conditions of the wireless device.

19. The wireless device of claim 17, wherein the processor is further configured with processor-executable instructions such that the conditions that affect the amount of time required to reorder and reassemble packets received from the communication network comprise one or more conditions of a wireless communication link between the wireless device and the communication network.

20. The wireless device of claim 17, wherein the processor is further configured with processor-executable instructions such that the conditions that affect the amount of time required to reorder and reassemble packets received from the communication network comprise one or more of:
a characteristic of packet retransmissions requested by the wireless device;
a characteristic of a delay tolerance of an application that uses the packets;
a characteristic of the packets received from the communication network; and
a characteristic of a loss of packet scheduling information.

21. The wireless device of claim 17, wherein the processor is further configured with processor-executable instructions to determine the timer adjustment based on historical condition information.

22. The wireless device of claim 17, wherein the timer is a network-determined timer, and the processor is further configured with processor-executable instructions to receive the network determined timer via a control signal from the network.

23. The wireless device of claim 17, wherein the processor is further configured with processor-executable instructions to:
determine one or more condition adjustments wherein each condition adjustment is based on a detected condition; and
determine the timer adjustment based on the determined one or more condition adjustments.

24. The wireless device of claim 17, wherein the processor is further configured with processor-executable instructions to:
receive additional packets and reorder the packets and the additional packets before the adjusted timer expires.

25. The wireless device of claim 17, wherein the processor is further configured with processor-executable instructions to:
detect one or more characteristics of requested packet retransmissions; and
determine the timer adjustment based on the detected characteristics of the requested packet retransmissions.

26. The wireless device of claim 17, wherein the processor is further configured with processor-executable instructions to:
detect the characteristic of the tune-away of a radio frequency resource of the wireless device from the first subscription to the second subscription; and
determine the timer adjustment based on the detected characteristic of the tune-away of the radio frequency resource.

27. The wireless device of claim 17, wherein the processor is further configured with processor-executable instructions to:
detect the characteristic of beam refinement operations performed by the wireless device; and determine the timer adjustment based on the detected characteristic of the beam refinement operations performed by the wireless device.

28. The wireless device of claim 17, wherein the processor is further configured with processor-executable instructions to:
    detect the characteristic of discontinuous reception configurations of the wireless device; and
    determine the timer adjustment based on the detected characteristic of discontinuous reception configurations of the wireless device.

29. A non-transitory processor-readable medium having stored thereon processor-executable instruction configured to cause a processing device in a wireless device to perform operations comprising:
    receiving packets from a communication network and storing the packets in a Packet Data Convergence Protocol (PDCP) reordering buffer of the wireless device;
    detecting one or more conditions that affect an amount of time required to reorder or reassemble at least some of the packets received from the communication network, the detected one or more conditions including a characteristic of at least one or more of:
        a tune-away of a radio frequency resource of the wireless device from a first subscription to a second subscription;
        a characteristic of beam refinement operations performed by the wireless device; or
        a characteristic of discontinuous reception configurations of the wireless device;
    determining a timer adjustment based on the detected one or more conditions;
    adjusting a timer with the determined timer adjustment; and
    delivering one or more packets from the PDCP reordering buffer in response to expiration of the timer.

30. A wireless device, comprising:
    means for receiving packets from a communication network and storing the packets in a Packet Data Convergence Protocol (PDCP) reordering buffer of the wireless device;
    means for detecting one or more conditions that affect an amount of time required to reorder or reassemble at least some of the packets received from the communication network, the detected one or more conditions including a characteristic of at least one or more of:
        a tune-away of a radio frequency resource of the wireless device from a first subscription to a second subscription;
        a characteristic of beam refinement operations performed by the wireless device; or
        a characteristic of discontinuous reception configurations of the wireless device;
    means for determining a timer adjustment based on the detected one or more conditions;
    means for adjusting a timer with the determined timer adjustment; and
    delivering one or more packets from the PDCP reordering buffer in response to expiration of the timer.

* * * * *